July 17, 1934.  V. E. CARBONARA  1,966,845
NAVIGATIONAL INSTRUMENT
Filed July 20, 1932   2 Sheets-Sheet 2
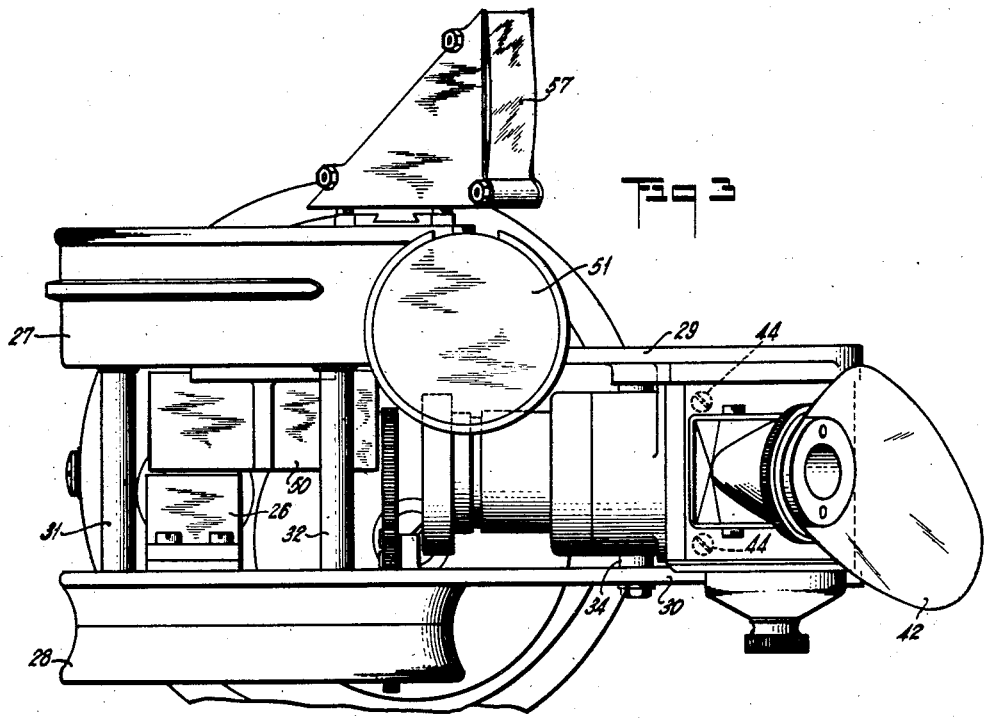
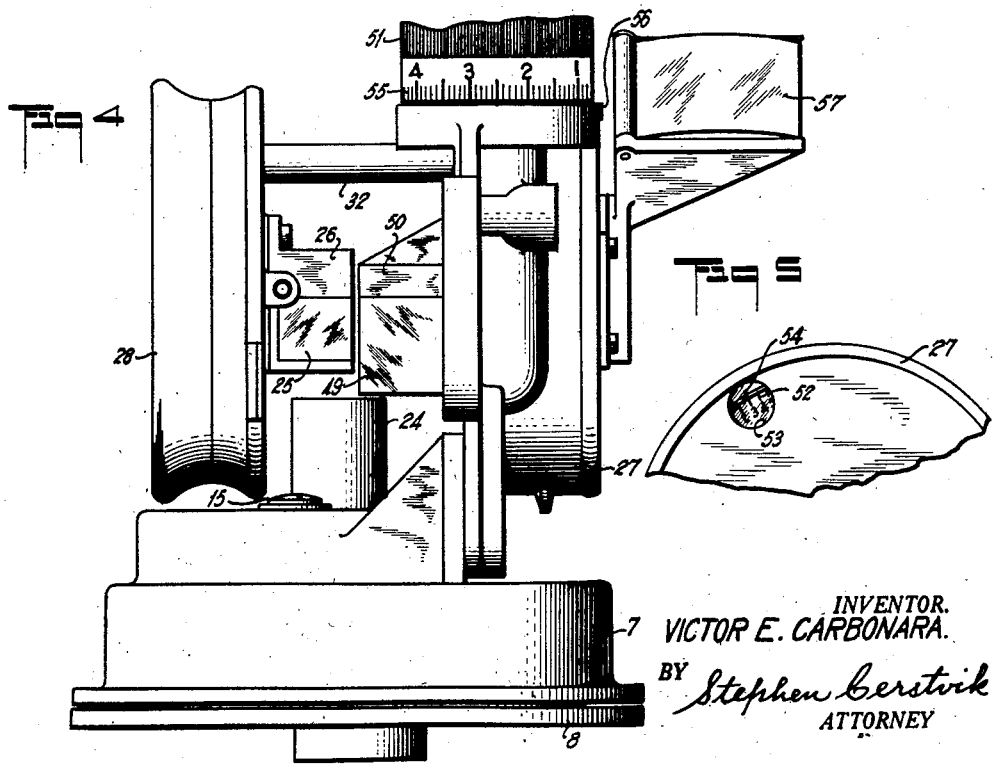
INVENTOR.
VICTOR E. CARBONARA.
BY Stephen Gerstvik
ATTORNEY Patented July 17, 1934

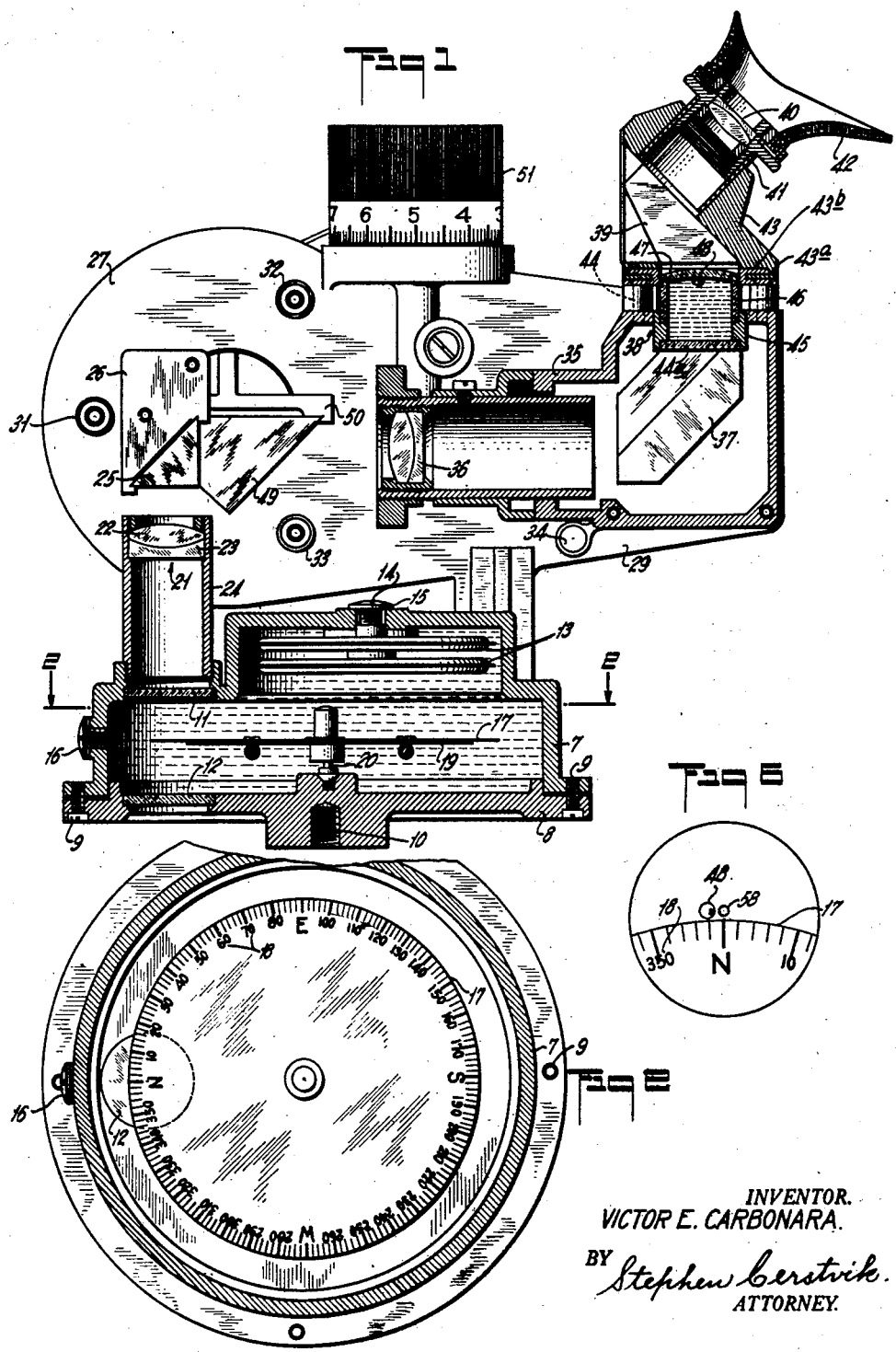

1,966,845

UNITED STATES PATENT OFFICE 1,966,845

NAVIGATIONAL INSTRUMENT

Victor E. Carbonara, Rockville Center, N. Y., assignor to Bendix Aviation Corporation, South Bend, Ind., a corporation of Delaware Application July 20, 1932, Serial No. 623,656

6 Claims. (Cl. 33—2.7)

The present invention relates to navigational instruments and more particularly to an instrument for simultaneously determining the altitude or depression and the azimuth or bearing of an object.

Heretofore, a separate instrument had to be employed to obtain the altitude or depression of an object whose bearing was to be determined, thereby necessitating the use of two separate instruments and separate individual manipulation of each in order to determine the bearing and the altitude of the object. Accordingly, one of the objects of the present invention is to provide a novel instrument whereby the foregoing disadvantages are eliminated.

Another object is to provide a novel instrument for readily and accurately taking bearings and altitudes or depressions of objects simultaneously.

Another object is to provide a novel combined sextant and azimuth compass wherein an enlarged field of view is substituted for the line of sight heretofore required.

Another object is to provide an instrument employing novel means for simultaneously measuring the altitude or depression and azimuth or bearing of an object whereby the observer is enabled to take altitudes and bearings in all directions as well as above and below the horizon without shifting the position of his eye.

Another object is to provide a novel instrument which is so constructed and arranged that an observer may simultaneously view, in the same field, images of the object of which it is desired to take a bearing and altitude, and of a portion of a compass card against which the bearing is to be measured and also an angle of a bubble which indicates the horizon.

Still another object is to provide a novel altitude and azimuth indicating instrument embodying an optical system whereby bearings and altitudes of illuminated objects, such as celestial objects, may be obtained at night.

A further object of the invention is to provide in an instrument of the class described and including a compass card, a novel optical system whereby the angular magnification of images of objects whose altitude and bearing are to be determined is equal to the angular magnification of the compass card.

A still further object is to provide a novel combined sextant and azimuth compass embodying an optical system for producing in the same field of view images of the object of which it is desired to take the altitude and bearing and also of a portion of a compass card against which such bearing is to be measured as well as an image of a bubble indicating the horizon, said optical system being so constructed and arranged that the angular magnification of the images of the object and of the compass card are substantially equal, whereby the position of the image of the object against the image of the card along the periphery of the latter and the collination of the bubble image against the other two images gives a direct and accurate reading of the altitude and of the bearing simultaneously.

The above and further objects and novel features of the invention will appear more fully hereinafter from a consideration of the detailed description which follows when taken in connection with the accompanying drawings wherein is illustrated one embodiment of the invention. It is to be expressly understood however, that the drawings are for the purpose of illustration and description only and are not designed as a definition of the limits of the invention, reference being primarily had for this purpose to the appended claims.

In the drawings wherein like reference characters refer to like parts throughout the several views, Fig. 1 is a side elevation, partly in section, of one form of instrument embodying the present invention;

Fig. 2 is a sectional view taken on line 2—2 of Fig. 1;

Fig. 3 is a top plan view of the instrument shown in Fig. 1;

Fig. 4 is an end view looking at the instrument from the right as seen in Fig. 1, with the telescope system removed;

Fig. 5 is a partial detail view of the dial from which the altitude readings are observed; and Fig. 6 is a detail view showing an example of the observer's field of view as seen through the eye piece of the instrument.

Referring now to the drawings and more particularly to Fig. 1 wherein one embodiment of the present invention has been illustrated employing a magnetic compass constituted by a bowl 7 which is hermetically sealed by means of a cover plate 8 in any suitable manner as, for example, by means of screws 9. The cover plate 8 is provided with a threaded hole 10 for mounting the instrument on a tripod (not shown) if desired, although it may be held in the hands of the observer. The upper portion of the bowl 7 and the cover plate 8 are provided with windows constituted by transparent members 11 and 12 respectively, preferably of glass, although any other suitable transparent material may be used. The purpose of the windows 11 and 12 will appear more fully hereinafter.

Expansible diaphragms 13 are provided in the upper portion of the bowl 7 for compensating for the expansion and contraction of a suitable damping liquid with which the bowl 7 is filled, the interior of said diaphragms being in communication with the atmosphere through an opening 14 provided in the diaphragm supporting member 15. A removable plug 16 is also provided in the side wall of the bowl 7 for renewing or replenishing the liquid therein. A compass card 17, provided with a scale 18, is carried by a circular plate 19 which is pivotally mounted on a post 20 centrally of the bowl 7 in a manner well known to those skilled in the art. Card 17 is of greater diameter than plate 19 so that the circumferential edge thereof extends below the periphery of said plate and is made of some suitable material so that light which enters the window 12 may pass therethrough and through the window 11 in the upper part of the bowl to collect the rays of light in an optical system for forming an image of a portion of the compass card and its graduations. For night observations an electric lamp (not shown) may be used to provide illumination of the compass card through the window 12.

Novel means are provided in combination with the above described compass for forming an image of a distant object (generally considered in optics to be at infinity) together with a portion of the compass card 17 in the same field of view whereby the two images may be simultaneously and adjacently observed. In the form shown, such means are constituted by a novel alidade consisting of a system of prisms and lenses so constructed and arranged that the angular magnification of the compass card is substantially equal to the angular magnification of the object. The novel alidade is constituted by lens 21 composed of a double convex lens 22 and a plano-concave lens 23 cemented together and carried in a tubular member 24, the lower end of which is secured to the upper part of the bowl 7 adjacent the window 11 for forming an image of the compass card at optical infinity. In order to obtain equal angular magnification of the images of the object whose altitude and bearing is to be determined and of the compass card, the focal length of the lens 21 is made substantially equal to the radius of the compass card 17. Thus the angular magnification of the images formed is equal to the angular values of the compass card when observed in the same field of view. Angular magnification may be defined as the ratio of the tangent of the angle of subtense (taken from the optical axis as the fixed reference line) of the image presented to the eye by the instrument, to the tangent of the angle under which the object would be seen by the naked eye. The image of the compass card formed by the lens 21 is then reflected from a vertical axis to a horizontal axis by means of a reflecting prism 25 carried by a bracket 26 between a pair of drums 27 and 28 constituting handle members of the instrument which together with plates 29 and 30 (Fig. 3) form a supporting structure for the remainder of the elements of the alidade, the plates 29 being secured together in spaced relation by means of spacing rods 31, 32, 33 and 34. Another portion of the alidade to which the reflected image of the compass card is passed from the reflecting prism 25 is constituted by a telescope 35 having an objective lens 36, the position of which may be adjusted to bring its focus to the desired position. The optical system of the telescope includes, in addition to the objective lens 36, a total reflecting prism 37, a bubble chamber 38, another reflecting prism 39 and an eye lens 40 positioned within a tubular member 41 to which is secured an eye buffer or guard 42. The cylindrical member 41 is arranged for slidable engagement with a support 43 which is rotatably mounted on the telescope in any suitable manner as by means of a flange 43a carried by said support and engaging a collar 43b secured to the telescope by means of screws 44, so that the position of the eye lens 40 may be adjusted relative to the prism 39 and the member 43 may be rotated about a vertical axis passing through the center of the bubble vessel 38 to suit the position of the observer's eye irrespective of the azimuth of the observed object. Thus light rays entering the window 12 pass through the compass card 17 and through the window 11 and then to the lens 21 which forms an image of the card at optical infinity, which image is then reflected by the prism 25 through the objective lens 36 of the telescope and is then reflected upwardly by the prism 37 through the bubble chamber 38 and by the prism 39 to the eye lens 40.

The bubble chamber 38 constitutes an artificial horizon by means of which the altitude of an object is determined and comprises a chamber consisting of a transparent glass bottom plate 44a, a metal cylinder 45, a transparent cylinder 46 secured to the metal cylinder and a concavo-convex meniscus 47 which is utilized both as a field lens and a cover for the bubble chamber. The bubble chamber is filled with a suitable liquid having the desired characteristics as to viscosity, transparency and index of refraction. A bubble 48 is permitted to remain in the chamber and serves as the reference member of the artificial horizon and may be illuminated in a novel manner as described in my copending application, Serial No. 537,974 filed May 15, 1931, by coating the outer surface of the glass cylinder 46 with a layer of some suitable luminous material such as radium paint, for example. The light emitted by the luminous material thus crosses a homogeneous medium as represented by the liquid which fills the bubble vessel and such light will not be visible except at the point where the light meets heterogeneous bodies in suspension in the liquid. The bubble 47 is obviously such a heterogeneous body relative to the liquid since it is formed by a vapor having an index of refraction which is considerably different from that of the liquid filling the remainder of the vessel.

Means are now provided for directing an image of an object into the instrument and for determining the altitude or depression of said object. In the form shown, said means comprise an index prism 49 carried by a bracket 50 rotatable about a horizontal axis transversely of the plates 29 and 30 and positioned in the field of the objective lens 36 of the telescope 35. As illustrated in Fig. 3, the index prism 49 is arranged to direct images of objects below the horizon for determining the depression of said objects with respect to the horizon but it is obvious that the same may be rotated through 180 degrees for directing images above the horizon, such as celestial bodies, for determining their altitudes. The prism 49 may be rotated about its horizontal axis by means of a thumb wheel 51 through suitable worm gearing (not shown) encased within the drum 27 in a manner set forth in my above referred to copending application Serial No. 537,974. The thumb wheel 51 and the mechanism which it controls are so arranged that the wheel may be easily rotated by a slight motion of the thumb when the instrument is gripped in the palms of the observer's hands by the drums 27 and 28.

A suitable scale (Fig. 5) is provided for indicating the angular positions of the rotatable index prism 49 relative to the horizon and comprises a series of circumferentially spaced graduations 52 carried by a dial operatively associated with the mechanism within the drum 27 and visible through a window 53 formed in the side of the drum 27 and having an index line 54 cooperating with the scale. A vernier scale is also provided for obtaining more accurate readings of the angular positions of the index prism and comprises a series of graduations 55 inscribed on the periphery of the thumb wheel 51 around the base thereof and cooperating with a reference mark 56. The index prism 49 being in the field of the objective lens 36 it will be apparent that images of objects whose bearing and altitude are to be determined will be simultaneously visible in the same field of view by means of the lens 40, as well as an image of the bubble 48, since the latter is included in the optical system. A lenticular prism 57 (Figs. 3 and 4) is secured to the drum 27 adjacent the window 53 so that the altitude graduations 52 may be viewed simultaneously with one eye of the observer while he views the images of the object and the compass card through the eye lens 40 with his other eye, thereby permitting him to make all observations without removing his eye from the eye piece of the instrument.

When it is desired to measure the altitude and azimuth of an object it is only necessary to turn the instrument about its vertical axis until the index prism 49 points toward the observed object. The thumb wheel 51 is then adjusted until the prism 49 is in a position such that it will reflect an image of the object to the objective lens 36 of the telescope 35, the light rays then striking the back of the prism 37 where they are turned through 90 degrees and directed through the bubble chamber 38 to prism 39 which turns the same through an angle of 45° so that the image can be viewed through eye lens 40. At the same time light rays passing through the bubble chamber 38 render bubble 48 visible through the eye lens 40, also light rays entering the window 12 pass through the transparent compass card 17, window 11, lens 21 and prism 25, the latter of which directs the rays through the telescope 35 in the same manner as the prism 49 to produce an image of the compass card in the same field of view with the images of the object and the bubble by the lens 36. By virtue of the fact that the focal length of the lens 21 is equal to the radius of the compass card 17, the images of the object and of the compass card are such that their angular magnifications finally produced by the eye lens 40 are equal. The result produced and observed through the eye lens 40 will be in effect as illustrated in Fig. 6 where there is shown an image 58 of a celestial body such as the sun, for example, and an image of the bubble 48 and also an image of a portion of the compass card 17. In obtaining a reading it is desirable that the images of the bubble 48 and the object 58 be maintained in close proximity and substantially on a common horizontal axis. Thus the collination of the bubble 48 with the object 58 will determine the altitude as indicated by the graduations 52 through the window 53 while the position of the object 58 with respect to the compass card 17, as seen in Fig. 6, will give a direct reading of the bearing without reference to any other fiducial than the object itself. As long as the object appears somewhere in the field of view of the instrument its magnetic azimuth can be taken directly by manipulating the instrument so as to bring the image of the object in close proximity to the virtual image of the compass card while maintaining the image of the object and the image of the bubble on a substantially horizontal axis.

There is thus provided a novel combined azimuth compass and sextant which enables an observer to readily and accurately obtain the azimuth and altitude or depression of a body simultaneously, and one which enables an observer to take bearings and altitude in any direction without shifting the position of his eye. Thus an observer in cramped quarters, such as in an airplane, may take bearings and altitudes with perfect ease.

A novel combination of elements is also provided whereby an image of the object, the altitude and azimuth of which it is desired to measure, is brought into close proximity with a virtual image of a suitable graduated scale, such as a compass card, against which the azimuth measurement is made, making said images simultaneously visible in a common field of view, and making the angular magnification of said images substantially equal so that the image of the object against the image of the compass card gives a direct and correct reading of the bearing of the object. Novel means are also provided whereby an artificial horizon is produced in the same field of view with the images of the object and compass card whereby both bearing and altitude may be obtained simultaneously and whereby it is necessary only to keep the observed object in a comparatively large field of view instead of in a definite line of sight.

Although only one form of the invention has been shown and described it is to be expressly understood that the same is not limited thereto but that various changes which will now appear to those skilled in the art, may be made in the mechanical form and in the arrangement of parts. For example, any type of compass may be employed in lieu of the magnetic compass illustrated, and the term "movable compass card" as employed in the claims is of sufficient scope to cover a scale graduated in degrees, such as a pelorus scale. Various other changes may also be made in the design and arrangement of parts shown without departing from the spirit of the invention. Reference is therefore to be had to the appended claims for a definition of the limits of the invention.

What is claimed is:

1. A combined azimuth compass and sextant comprising means for indicating the horizon, a compass card, means for producing in the same field of view an image of the compass card, an image of said horizon indicating means and an image of an object whose azimuth and altitude or depression are to be determined, said image producing means including means for causing equal angular magnification of the card image and object image, means for measuring the altitude or depression of said object with respect to the horizon, an eye piece for viewing said images whereby the azimuth of the object is determined directly from the card image, and means associated with said measuring means for producing an image of the indication thereof adjacent said eye piece whereby an observer may view the latter image with one eye while observing the other images through the eye piece with his other eye.

2. An instrument for simultaneously measuring the azimuth and altitude or depression of objects, comprising in combination, a compass bowl having a rotatable compass card therein influenced by the earth's magnetic field, a pair of spaced parallel plates supported vertically on said compass bowl, means formed with said plates and constituting a pair of handles for holding the instrument in operating position, an optical system between said plates for forming an image of the compass card and an image of an object in a common focal plane, said system including a bubble-level an image of which is formed in the same field of view with said card image and object image, a rotatable reflecting member associated with said optical system, means including a driving member positioned interiorly of one of the handles and drivably connected to the rotatable reflecting member for measuring the angle of rotation of said reflecting member, and an eye piece forming part of the optical system for viewing said images.

3. An instrument for simultaneously measuring the azimuth and altitude or depression of objects, comprising in combination, a compass bowl having a rotatable compass card therein influenced by the earth's magnetic field, a pair of spaced parallel plates supported vertically on said compass bowl, means formed with said plates and constituting a pair of handles for holding the instrument in operating position, an optical system between said plates for forming an image of the compass card and an image of an object in a common focal plane, a bubble-level forming part of said optical system whereby an image of the bubble of said level is formed in the same field of view with said card image and object image, means also included in said system for producing equal angular magnification of the object image and card image, a rotatable reflecting member associated with said optical system for directing light rays from the object into said system, means for measuring the angle of rotation of said reflecting member, and an eye piece forming part of the optical system for viewing said images whereby the azimuth of the object is determined directly from the card image.

4. An instrument for simultaneously measuring the azimuth and altitude or depression of objects, comprising in combination, a compass bowl having a rotatable compass card therein influenced by the earth's magnetic field, a pair of spaced parallel plates supported vertically on said compass bowl, means formed with said plates and constituting a pair of handles for holding the instrument in operating position, an optical system between said plates for forming, in a common focal plane, an image of the compass card and an image of an object whose azimuth and altitude or depression are to be determined, a bubble-level forming part of said optical system whereby an image of the bubble of said level is formed in the same field of view with said card image and object image, means also included in said system for producing equal angular magnification of the object image and card image, a rotatable reflecting member associated with said optical system for directing light rays from the object into said system, means for measuring the angle of rotation of said reflecting member including means for indicating said angle, an eye piece forming part of the optical system for viewing said images whereby the azimuth of the object is determined directly from the card image, and means associated with said indicating means for producing an image of the indication thereof adjacent said eye piece whereby an observer may view the latter image with one eye while observing the other images through the eye piece with his other eye.

5. An instrument for simultaneously measuring the azimuth bearing and altitude or depression of objects, comprising in combination, a compass bowl having a rotatable compass card therein influenced by the earth's magnetic field, means associated with said bowl and constituting a pair of handle members disposed on opposite sides of said bowl for holding the instrument in operating position, an optical system between said handle members and forming an image of the compass card and an image of a remote object in a common focal plane, said system including a bubble-level an image of which is formed in the same field of view with said card image and object image, a rotatable reflecting member associated with said optical system, means including a driving member positioned interiorly of one of the handle members and drivably connected to the rotatable reflecting member for measuring the angle of rotation, and an eye-piece forming part of the optical system for viewing said images.

6. An instrument for simultaneously measuring the azimuth bearing and altitude or depression of remote objects, comprising in combination, a compass having a rotatable compass card for indicating direction, transparent graduations on said card, means for permitting the passage of light rays upwardly through said graduations, means rotatable about a horizontal axis for reflecting an image of a remote object into said instrument, means for measuring the angle of rotation of said reflecting means, an optical system for forming an image of the compass card and the image of the remote object in a common focal plane, said system including a bubble-level an image of which is produced in the same field of view with said card image and object image, said system also including an objective lens having a focal length equal to the radius of the compass card and positioned above the latter in the path of the light rays passing through the card graduations whereby equal angular magnification of the card image and object image is obtained, and an eye-piece for viewing all of said images.

VICTOR E. CARBONARA.

CERTIFICATE OF CORRECTION.

Patent No. 1,966,845. July 17, 1934.

VICTOR E. CARBONARA.

It is hereby certified that error appears in the printed specification of the above numbered patent requiring correction as follows: Page 1, line 37, for "angle" read image; and that the said Letters Patent should be read with this correction therein that the same may conform to the record of the case in the Patent Office.

Signed and sealed this 2nd day of October, A. D. 1934.

(Seal)

Leslie Frazer
Acting Commissioner of Patents.